(12) United States Patent
Alkemper et al.

(10) Patent No.: US 7,172,983 B2
(45) Date of Patent: Feb. 6, 2007

(54) SIO$_2$-TIO$_2$ GLASS BODY WITH IMPROVED RESISTANCE TO RADIATION

(75) Inventors: Jochen Alkemper, Klein-Winternheim (DE); Joerg Schuhmacher, Kornwestheim (DE); Hrabanus Hack, Mainz (DE); Oliver Sohr, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/087,885

(22) Filed: Mar. 23, 2005

(65) Prior Publication Data

US 2005/0215413 A1  Sep. 29, 2005

(30) Foreign Application Priority Data

Mar. 23, 2004  (DE) ............ 10 2004 015 766

(51) Int. Cl.
*C03C 3/06* (2006.01)
*C03B 20/00* (2006.01)
*C03B 25/00* (2006.01)

(52) U.S. Cl. .......... 501/54; 65/17.4; 65/32.1; 65/104; 65/111

(58) Field of Classification Search .......... 501/54, 501/56, 73
See application file for complete search history.

(56) References Cited

U.S. PATENT DOCUMENTS

| 4,491,604 | A | | 1/1985 | Lesk et al. |
|---|---|---|---|---|
| 5,698,484 | A | * | 12/1997 | Maxon .................. 501/54 |
| 5,970,751 | A | | 10/1999 | Maxon et al. |
| 6,487,879 | B1 | * | 12/2002 | Blackwell et al. .......... 65/414 |
| 6,576,578 | B1 | * | 6/2003 | Ikuta et al. .................. 501/54 |
| 6,595,030 | B1 | | 7/2003 | Bauch et al. |
| 2002/0151425 | A1 | * | 10/2002 | Fujinoki et al. ............. 501/54 |
| 2002/0157421 | A1 | * | 10/2002 | Ackerman et al. ......... 65/17.6 |
| 2004/0027555 | A1 | * | 2/2004 | Hrdina et al. ................ 356/33 |

FOREIGN PATENT DOCUMENTS

| DE | 19 09 433 | | 2/1979 |
|---|---|---|---|
| DE | 198 41 932 A1 | | 3/2000 |
| GB | 1213603 A | * | 11/1970 |
| WO | 02/32622 A1 | | 4/2002 |

* cited by examiner

*Primary Examiner*—David Sample
(74) *Attorney, Agent, or Firm*—Harness, Dickey & Pierce, P.L.C.

(57) ABSTRACT

The invention discloses an SiO$_2$—TiO$_2$ glass, which is preferably made by flame-hydrolysis and which distinguishes itself by increased resistance to radiation, especially in connection with EUV lithography. By purposefully reducing the hydrogen content, clearly improved resistance to radiation and reduced shrinking is achieved.

20 Claims, 2 Drawing Sheets

SIO₂-TIO₂ GLASS BODY WITH IMPROVED RESISTANCE TO RADIATION

BACKGROUND OF THE INVENTION

The present invention relates to an $SiO_2$—$TiO_2$ glass suited especially for components used in EUV lithography, such as substrate materials for reflective mirror optics and masks or the like.

During a lithographic process, the structures for integrated circuits present on the mask are transferred to a silicon wafer by projection of laser radiation of a given wavelength. Especially in EUV lithography a wavelength of approximately 13 nm is used. Given the fact that there do not exist any materials that are pervious to light of that wavelength, reflective masks and optics are used in that process. It is the object of that technique to realize on the silicon wafer structures in widths of up to 35 nm.

$SiO_2$—$TiO_2$ glasses with a $TiO_2$ content in the range of between approximately 6 and 8 percent by weight, for example, are employed as a preferred material in the production of components for EUV lithography, the thermal expansion occurring in the temperate range of between −50 and +100° Celsius being very small. For example, a glass of that type having a $TiO_2$ content of 6.85 percent by weight shows zero expansion in the temperature interval from 19 to 25° Celsius.

Flame hydrolysis is a commonly used method for the production of $SiO_2$—$TiO_2$ glasses. As part of that method, gaseous $SiO_2$ (for example $SiCl_4$ or Si-alkoxide vapor) and $TiO_2$ precursors (such as $TiCl_4$ or Ti-alkoxide vapor) are exposed to a natural gas flame or a detonating gas flame (compare in this regard U.S. Pat. No. 5,970,751, WO 0232622 and U.S. Pat. No. 4,491,604, for example). The initial compounds thereby react, forming $SiO_2$ and $TiO_2$ droplets or mixtures thereof, which in turn are deposited on a die positioned below the flame. As a rule, the temperature conditions are selected to ensure that a compact glassy body is formed by that process. The process is also generally known as flame-hydrolytic direct deposition.

Flame-hydrolytic direct deposition is a preferred method for the production of $SiO_2$—$TiO_2$ glasses, being a single-step process by means of which relatively large dimensions (masses of up to several hundred kilograms) can be produced in a comparatively low-cost way.

During EUV lithography, the structures to be transferred from the mask are inscribed by an electron beam. The realization of structures of smaller widths requires in this case ever higher acceleration speeds. As a result, instead of being moderated by the layers near the mask surface, an ever greater part of the electron beam will penetrate into and damage the substrate material below those layers. That damage normally makes itself felt by compaction of the material in the irradiated places. As it is only the irradiated side of the substrate material that gets compacted, i.e. that shrinks, the substrate may get distorted. This is a critical factor with respect to the imaging quality. The specifications for EUV mask substrates prescribe a flatness value of 50 nm PV (peak-to-valley value according to SEMI P37-1101). Extensive polishing and finishing processes are necessary if this value is to be reached. Any subsequent variation, which may occur for example during electron beam irradiation while inscribing the mask, may become critical already at a distortion of a few 10 nm.

Now, it has been found that $SiO_2$—$TiO_2$ glasses produced by the flame-hydrolysis process are especially sensitive to damage by radiation.

In view of this it is a first object of the present invention to disclose an improved $SiO_2$—$TiO_2$ glass which, compared with conventional $SiO_2$—$TiO_2$ glasses, offers improved resistance to radiation.

It is a second object of the invention to disclose an improved $SiO_2$—$TiO_2$ glass which is suited in particular for use in EUV lithography.

It is a third object of the invention to disclose a manufacturing process for the production of an improved $SiO_2$—$TiO_2$ glass which, compared with conventional $SiO_2$—$TiO_2$ glasses, offers better resistance to radiation.

SUMMARY OF THE INVENTION

The invention achieves this object by an $SiO_2$—$TiO_2$ glass body which preferably is made by flame-hydrolysis and whose content of $H_2$ is $<10^{17}$ molecules/cm³, preferably $<5·10^{16}$ molecules/cm³.

It has been detected by the invention that the sensitiveness of $SiO_2$—$TiO_2$ glasses or $SiO_2$—$TiO_2$ glass bodies produced by flame-hydrolysis processes, is predominantly due to their hydrogen content.

As a result of the flame-hydrolysis process, conventional $SiO_2$—$TiO_2$ glasses comprise free OH groups and physically solved elementary hydrogen, both of which can be regarded as doping agents. $SiO_2$—$TiO_2$ glasses produced by a flame-hydrolysis process rarely have a concentration of OH groups of less than 300 ppm, while the $H_2$ content is normally $10^{18}$ molecules/cm³ or higher. When the flame-hydrolysis process takes place in a detonating gas flame, then the $H_2$ content may even be higher by one order of magnitude.

The damaging effect of the hydrogen is in contradiction to experience made in the past with the damage behavior of quartz glasses for transmissive lithography processes (at 248 and 193 nm). A high hydrogen content leads in this case to decreased reduction in transmission under irradiation, i.e. has a positive effect on the functionality of the material. In contrast, an influence of the hydrogen content of the material on a possible radiation-induced compacting effect has not been known heretofore.

Now, when the $H_2$ content is reduced according to the invention to less than $10^{17}$ molecules/cm³, preferably to $<5·10^{16}$ molecules/cm³, a clearly lower sensitiveness of the $SiO_2$—$TiO_2$ glass to radiation-induced shrinking (compaction) is observed.

As has been mentioned before, such $SiO_2$—$TiO_2$ glasses with reduced hydrogen content are especially well suited as radiation-resistant components for EUV lithography and/or as starting materials for the production of such components, i.e. especially as mask substrates or mirror substrates.

With respect to the production method, the object of the invention is further achieved by a method where an $SiO_2$—$TiO_2$ glass is produced preferably by flame-hydrolysis, whereafter the content of $H_2$ is reduced by annealing of the glass.

The glass is preferably annealed for this purpose at a temperature of between approximately 400 and 800° Celsius.

Preferably, the glass is annealed for a period of 12 hours to 7 days, more preferably of 2 to 5 days.

Duration and temperature are preferably selected for this purpose to obtain a $H_2$ content $<5·10^{17}$ molecules/cm³, preferably $<5·10^{16}$ molecules/cm³.

The temperature is conveniently selected in this case to be as high as possible to achieve $H_2$ diffusion, but at the same time to be low enough to not change the structure of the glass. Annealing is, thus, preferably carried out at a temperature below the glass transition temperature $T_g$.

Annealing is carried out, preferably, in an atmosphere that does not cause strong oxidation, for example in air, a vacuum or in a protective gas, such as He or Ar.

Production of the quartz glass by the flame-hydrolysis process is preferably effected by "rocking", i.e. with a relative movement between the burner and the quartz glass body in axial and radial direction, see U.S. Pat. No. 6,595,030 which is fully incorporated by reference.

The diameter of the cylindrical quartz glass body so produced is preferably ≧180 mm, for example 220 mm to 260 mm. As a rule, only an inner "good" glass zone of, for example, 120 to 140 mm is used out of that cylinder. The resulting quartz glass body can then be further processed by remolding, cutting, grinding, lapping and/or polishing, to form components preferably for EUV lithography.

According to a preferred embodiment of the invention the homogeneity (peak-to-valley, PV) of the coefficient of thermal expansion does not exceed 6 ppb/K.

It is understood that the features of the invention mentioned above and those yet to be explained below can be used not only in the respective combination indicated, but also in other combinations or in isolation, without leaving the scope of the present invention.

BRIEF DESCRIPTION OF THE DRAWINGS

Further features and advantages of the invention will be apparent from the description that follows of certain preferred embodiments, with reference to the drawing in which.

DETAILED DESCRIPTION OF PREFERRED EMBODIMENTS

The improved resistance to radiation of $SiO_2$—$TiO_2$ glasses with a low $H_2$ content, produced by flame-hydrolysis, was verified by the following experiment:

EXAMPLE

An $SiO_2$—$TiO_2$ quartz glass cylinder is produced from $SiCl_4$ and $TiCl_4$ by the flame-hydrolysis process as described in U.S. Pat. No. 6,595,030. The quartz glass body so obtained showed the homogeneity of Ti content and CTE illustrated in FIG. 3 and FIG. 4. Starting out from the cylinder, mask substrates having a diameter of 6 inches were produced by cutting, remolding, lapping and polishing.

Three polished mask substrates of 6 inches in diameter, with different $H_2$ concentrations, were first subjected to an initial flatness measurement, whereafter the entire lower surfaces of the substrates were irradiated with electrons in identical way. This was followed by a second flatness measurement and determination of the distortion of the substrate. To this end, both the induced radius of curvature and the variation of the PV value can be used as measure of flatness variation.

The distortion of the substrate and the $H_2$ content in the glass show a strong linear correlation, the flatness variation increasing as the $H_2$ content rises and/or the induced radius of curvature decreasing as the $H_2$ content rises.

The results obtained for three different substrates, all produced by the flame-hydrolysis process, with different $H_2$ content, are summarized in Table 1.

In order to reduce the hydrogen content, Substrate II was subjected to a separate temperature treatment after the flame-hydrolytic deposition process, at temperatures generally below the glass transition temperature, i.e. in a range of 400 to 800° Celsius. That treatment was carried out in air (not, however, in an atmosphere with pure oxygen).

The data from the temperature treatment of Substrate II are summarized in Table 2. In contrast, Substrates I and III were not subjected to any further temperature treatment.

The $H_2$ content values determined were those summarized in Table I. The residual hydrogen content values were determined in the present case by Raman spectroscopy.

TABLE 1

| | $H_2$ content [$10^{16}$ molecules/cm$^3$] | Induced Radius of curvature [m] | PV variation [nm] |
|---|---|---|---|
| Substrate I | 350 | 33400 | 73 |
| Substrate II | 3 | 66600 | 37 |
| Substrate III | 100 | 56100 | 44 |

TABLE 2

| Temperature at start [° C.] | Final temperature [° C.] | Duration [h] |
|---|---|---|
| 5 | 500 | 3 |
| 500 | 500 | 60 |
| 500 | 5 | 5 |

Figure 1:
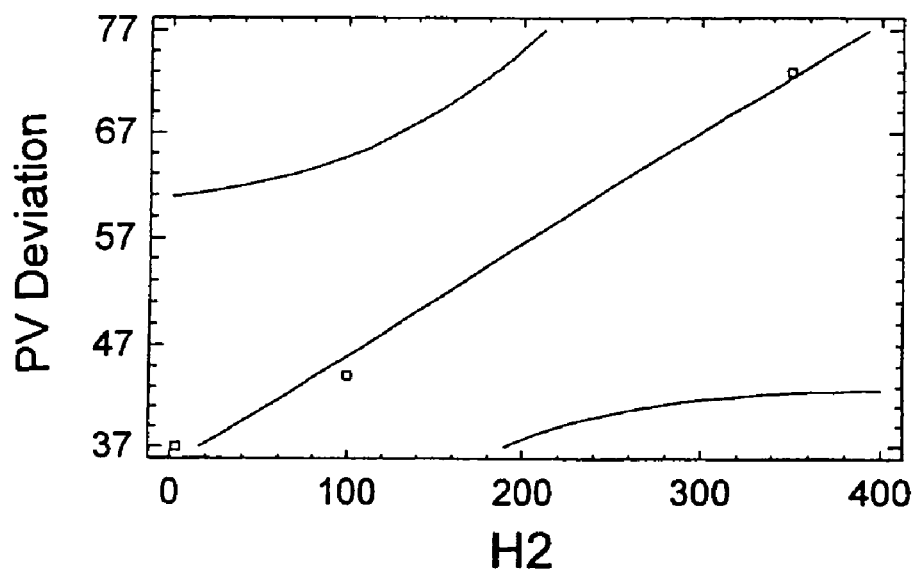
FIG. 1 shows a plot of the variation of the PV value as a function of the $H_2$ content, together with a regression plot.
Figure 2:
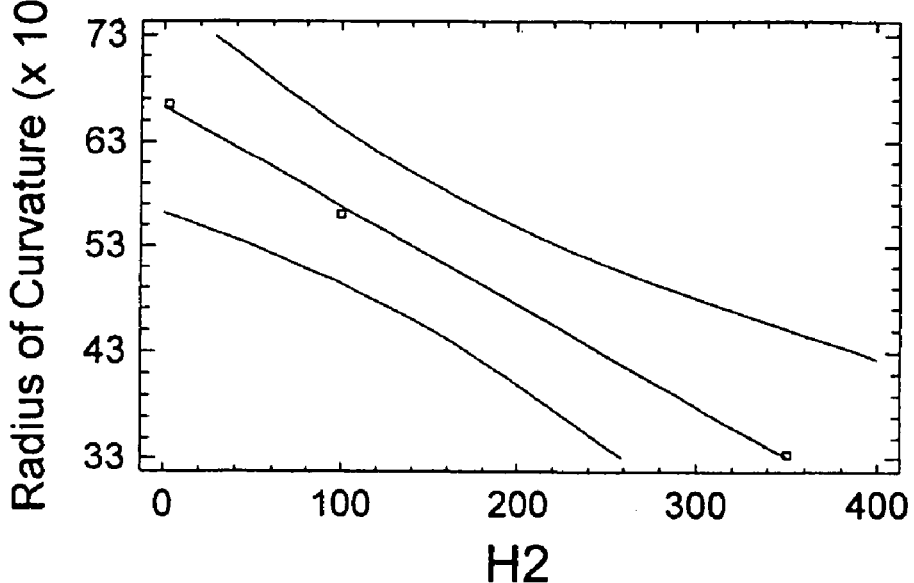
FIG. 2 shows a plot of the radiation-induced radius of curvature, as a function of the $H_2$ content, together with a regression plot.

The interdependencies of the PV variation and/or the induced radius of curvature and the $H_2$ content, resulting from the data summarized in Table 1, are illustrated in FIGS. 1 and 2.

These show the measured values contained in Table 1 together with the linear regression according to the method of least squares and relevant tolerances (2σ lines).

In FIG. 1, the flatness variation (PV variation in nanometers) of polished mask substrates, made from $SiO_2$—$TiO_2$ glass with a $TiO_2$ content of 6.8 percent by weight, is given as a function of the $H_2$-Gehalt in the substrate material after electron beam irradiation (in $10^{16}$ molecules/cm$^3$). The linear regression is plotted with $R^2$=99,19% and with relevant tolerance lines (2σ lines for the forecast range of 95%).

In FIG. 2, the corresponding correlation of the induced radius of curvature (given in $10^3$ m) is plotted as a function of the $H_2$ content (in $10^{16}$ molecules/cm$^3$). The linear regression is plotted in this case with $R^2$=99,84% and with the tolerance lines (2σ lines).

It can be clearly seen that the PV variation increases linearly with the rise of the $H_2$ content in the stated range.

Likewise, it can be seen that the induced radius of curvature decreases linearly with the rise of the $H_2$ content in the stated range.

Figure 3:
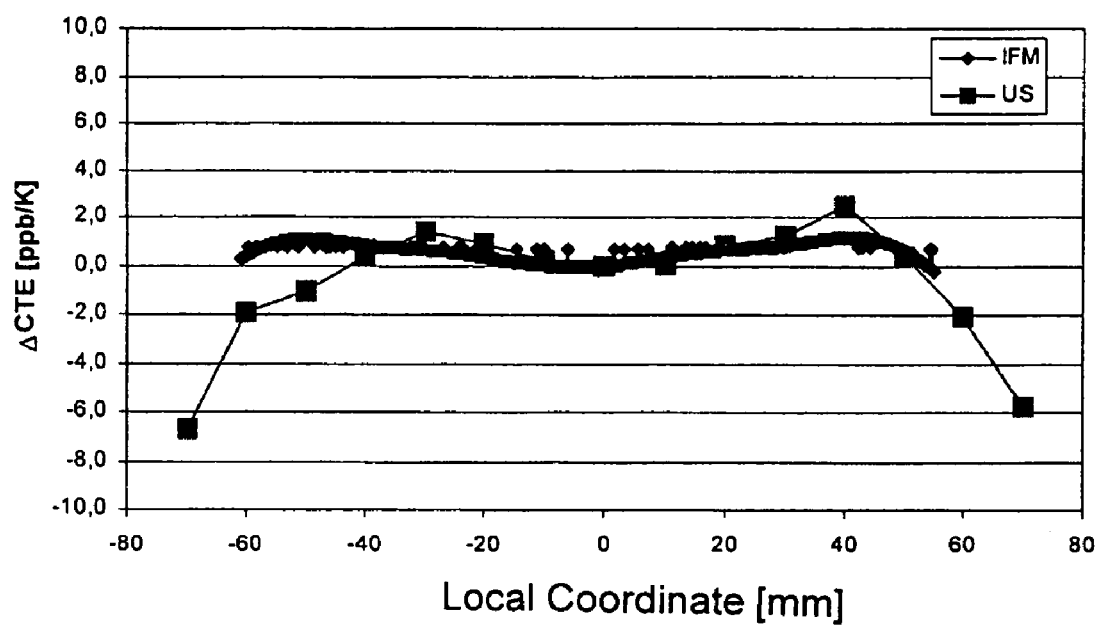
FIG. 3 shows the homogeneity of the CTE (measured by interferometer, IF) over the local coordinate (PV 1.1 ppb/K) and ultrasound (US) over the local coordinate (PV 4.6 ppb/K)

In FIG. 3 the homogeneity of the CTE is demonstrated by plotting ΔCTE (in ppb/K) over the local coordinate (in mm), measured (a) by interferometry IFM (PV value: 1.1 ppb/K) and (b) by ultrasound US (PV value: 4.6 ppb/K).

Figure 4:
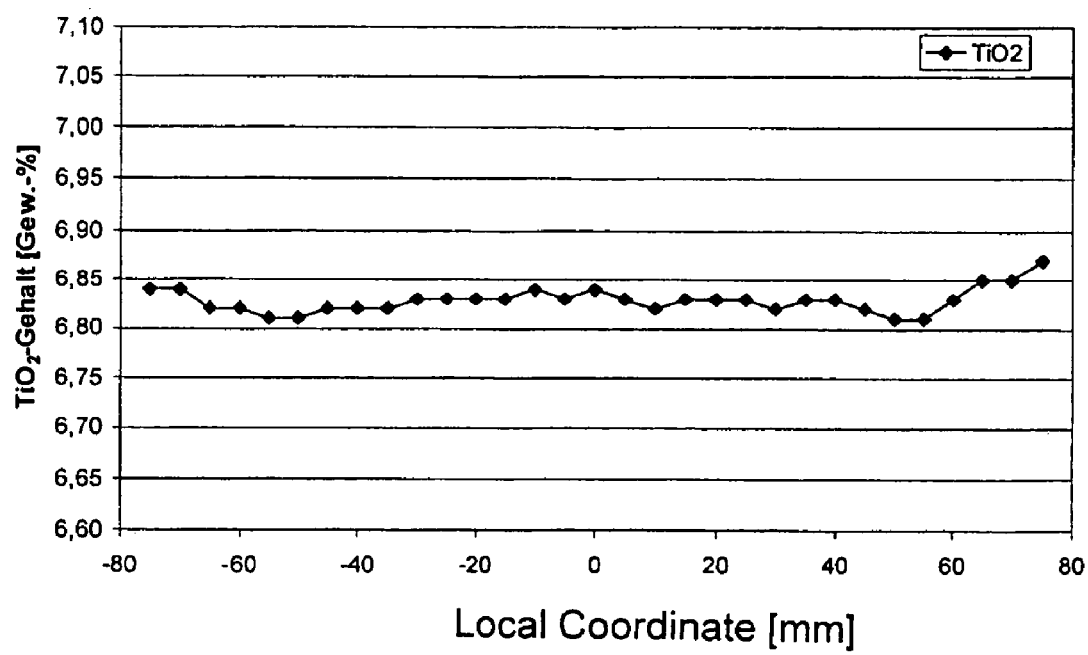
FIG. 4 shows the homogeneity of the $TiO_2$ content over the local coordinate (PV value=0.06 percent by weight).

In FIG. 4 the homogeneity of the $TiO_2$ content is demonstrated by plotting the $TiO_2$ content (in wt.-%) over the local coordinate, measured in millimeters (PV value: 0.06 wt.-%).

The invention claimed is:

1. An $SiO_2$—$TiO_2$ glass body comprising about 6 to 8 percent by weight of $TiO_2$ and containing less than $10^{17}$ molecules/cm$^3$ of $H_2$.

2. The $SiO_2$—$TiO_2$ glass body of claim 1 containing less than $5·10^{16}$ molecules/cm$^3$ of $H_2$.

3. The $SiO_2$—$TiO_2$ glass body of claim 2 having a coefficient of thermal expansion (CTE) which has a homogeneity of maximally 6 ppb/K PV (peak-to-valley) across a selected area of at least 60 mm diameter.

4. The $SiO_2$—$TiO_2$ glass body of claim 3 having been produced by flame hydrolysis.

5. An $SiO_2$—$TiO_2$ glass body containing less than $10^{17}$ molecules/cm$^3$ of $H_2$ and having a diameter of at least 180 mm.

6. A radiation-resistant component for EUV lithography, consisting of a $SiO_2$—$TiO_2$ glass comprising about 6 to 8 percent by weight of $TiO_2$ and having a $H_2$ content which is smaller than $10^{17}$ molecules/cm$^3$.

7. The radiation-resistant component of claim 6 having a $H_2$ content which is smaller than $5·10^{16}$ molecules/cm$^3$.

8. The radiation-resistant component of claim 6 having a flatness variation (PV) of maximally 40 nanometers: PV ≦40 nm.

9. The radiation-resistant component of claim 6, having a variation of the coefficient of thermal expansion (Δ CTE) of maximally 6 ppb/K PV.

10. A method of producing a radiation-resistant $SiO_2$—$TiO_2$ glass comprising the steps of:
    producing an $SiO_2$—$TiO_2$ glass comprising about 6 to 8 percent by weight of $TiO_2$;
    processing the glass to a desired shape; and
    annealing the glass for reducing the $H_2$ content until the $H_2$ content is less than $10^{17}$ molecules/cm$^3$.

11. The method as defined in claim 10, wherein the glass is annealed until the $H_2$ content is smaller than $5·10^{16}$ molecules/cm$^3$.

12. The method as defined in claim 10, wherein the glass is produced by flame-hydrolysis.

13. The method of claim 12, wherein the glass is produced by flame-hydrolysis using a rocking process.

14. The method of claim 10, wherein the glass is annealed at a temperature of between approximately 400° and 800° Celsius.

15. The method claim 14, wherein the glass is annealed for a time from twelve hours to seven days.

16. The method of claim 14, wherein the glass is annealed under an atmosphere selected from the group formed by a protective gas, a vacuum, a slightly oxidizing gas, and air.

17. The method of claim 14, wherein the glass is annealed at a temperature below the glass transition temperature.

18. The method of claim 10, wherein the processing step is performed to produce a component for EUV lithograph, whereby the method produces a radiation-resistant component for EUV lithography.

19. The method of claim 18, wherein the processing step comprises at least one of remolding, cutting, grinding, polishing and lapping.

20. A method of producing a radiation-resistant $SiO_2$—$TiO_2$ glass comprising the steps of:
    producing an $SiO_2$—$TiO_2$ glass;
    processing the glass to a desired shape; and
    annealing the glass for reducing the $H_2$ content, wherein the glass is annealed until the $H_2$ content is less than $10^{17}$ molecules/cm$^3$, at a temperature of between approximately 400 and 800° Celsius, for a time from two to seven days.

* * * * *

UNITED STATES PATENT AND TRADEMARK OFFICE
CERTIFICATE OF CORRECTION

PATENT NO. : 7,172,983 B2 Page 1 of 1
APPLICATION NO. : 11/087885
DATED : February 6, 2007
INVENTOR(S) : Jochen Alkemper et al.

It is certified that error appears in the above-identified patent and that said Letters Patent is hereby corrected as shown below:

Title Page,
Item [54], "SIO$_2$-TIO$_2$ GLASS BODY WITH IMPROVED RESISTANCE TO RADIATION" should be -- SiO$_2$-TiO$_2$ GLASS BODY WITH IMPROVED RESISTANCE TO RADIATION --.

Signed and Sealed this

Tenth Day of July, 2007

JON W. DUDAS
*Director of the United States Patent and Trademark Office*